Jan. 17, 1961     I. S. DE WOSKIN     2,968,097
ORTHODONTIC APPLIANCES
Filed Jan. 12, 1959     3 Sheets-Sheet 1
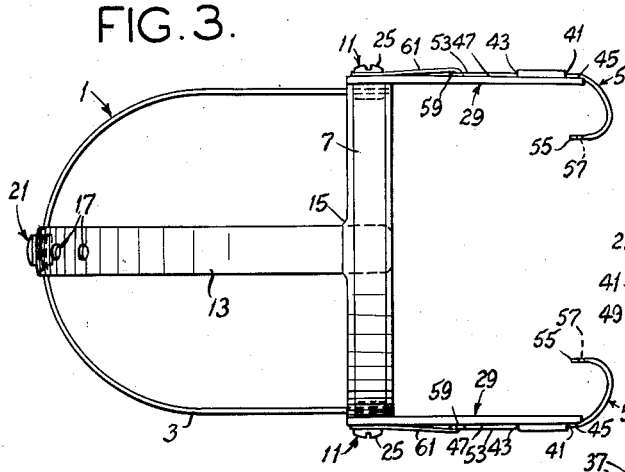
Irvin S. De Woskin,
Inventor.
Koenig and Pope,
Attorneys.

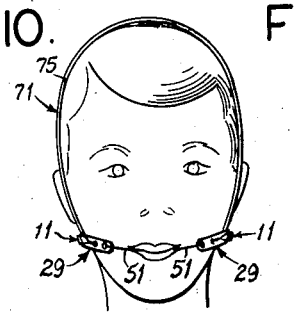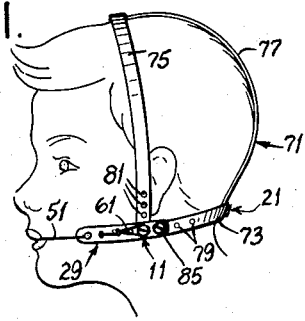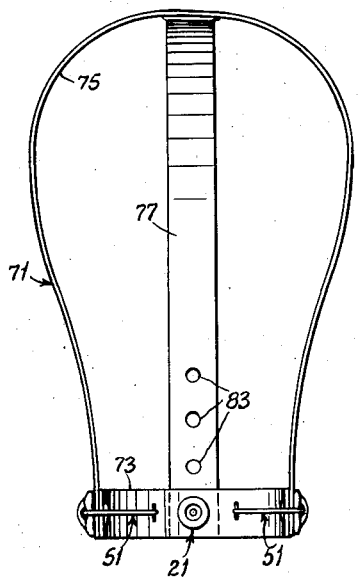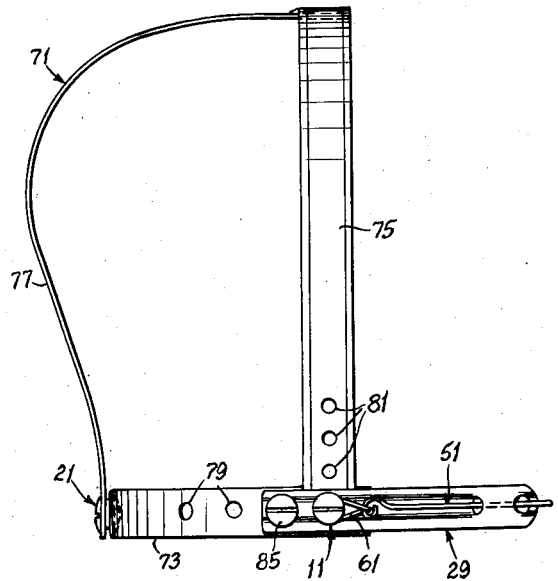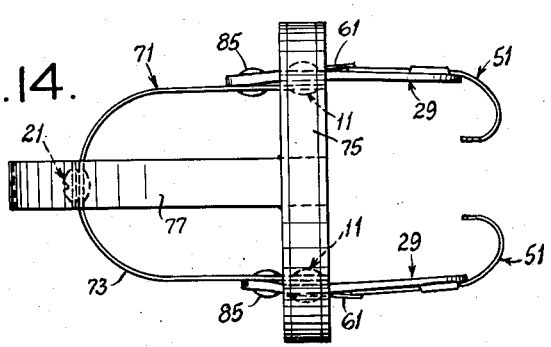

Irvin S. De Woskin,
Inventor.
Koenig and Pope,
Attorneys.

United States Patent Office 2,968,097
Patented Jan. 17, 1961

2,968,097
ORTHODONTIC APPLIANCES
Irvin S. De Woskin, 1000 Washington Ave., St. Louis, Mo.
Filed Jan. 12, 1959, Ser. No. 786,306
18 Claims. (Cl. 32—14)

This invention relates to orthodontic appliances, and more particularly to orthodontic headgear for use in conjunction with so-called arch bands to apply traction for orthodontic purposes.

Among the several objects of the invention may be noted the provision of improved headgear of the class described having means for slidably guiding a pair of face bows to be hooked to an arch band, elastic bands being secured to the headgear and the face bows for exerting traction on the arch band; the provision of headgear of this class which is readily adjustable for different head sizes and which is comfortable to wear; the provision of headgear of this class which is specially adapted for applying traction to a maxillary arch band, referred to as a high pull headgear; the provision of headgear of this class which is specially adapted for applying traction to a maxillary or mandibular arch band, referred to as a low pull headgear; and the provision of headgear which may be used both as a high pull headgear and a low pull headgear. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a front elevation illustrating a high pull headgear of this invention as it is worn on the head;

Fig. 2 is a side elevation of Fig. 1;

Fig. 3 is a top plan view of the high pull headgear per se on a larger scale than Figs. 1 and 2;

Fig. 4 is a front elevation of the high pull headgear per se on the scale of Fig. 3;

Fig. 5 is a side elevation of Fig. 4;

Fig. 6 is an enlarged cross section taken on line 6—6 of Fig. 4;

Figure 15:
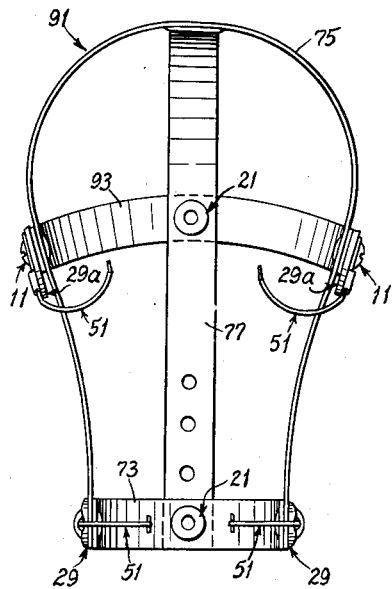
Figure 16:
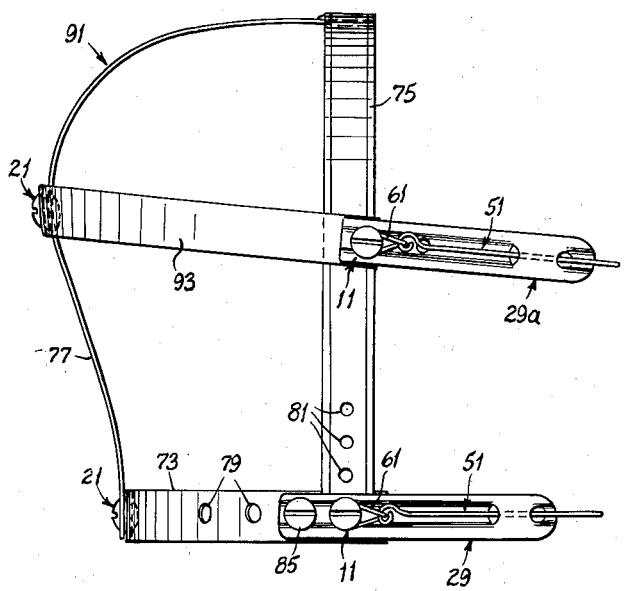
Figure 17:
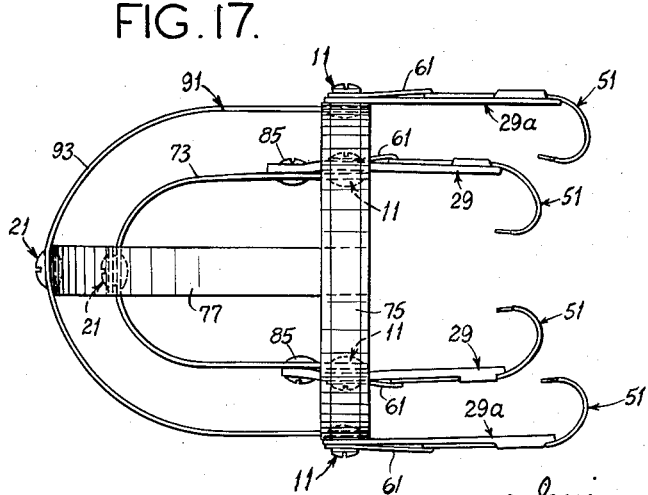

Figs. 7 and 8 are enlarged cross sections taken on lines 7—7 and 8—8, respectively, of Fig. 5;

Fig. 9 is a perspective view of a face bow per se;

Figs. 10 and 11 are views similar to Figs. 1 and 2 showing a low pull headgear of this invention;

Fig. 12 is a front elevation of the low pull headgear on a larger scale than Figs. 10 and 11;

Fig. 13 is a side elevation of Fig. 12;

Fig. 14 is a plan view of Fig. 13;

Fig. 15 is a front elevation of a combination high pull and low pull headgear of this invention;

Fig. 16 is a side elevation of Fig. 15; and,

Fig. 17 is a plan view of Fig. 16.

Corresponding reference characters indicate corresponding parts throughout the several views of the drawings.

Referring to Figs. 1–5 of the drawings, there is indicated at 1 a high pull headgear of this invention. As shown, this comprises a first strap 3 adapted to be positioned extending around the back of the head from one side of the head to the other. In general, this strap 3, which may be referred to as the back strap of the headgear, is of such length as to be capable of extending around the back of the head (the occiput) from ear to ear. Accordingly, it constitutes an occipital strap. It is provided with a hole 5 at one end (see Fig. 7) and a similar hole 5 at its other end. A second strap 7 is secured at its ends to the ends of the back strap 3 and is adapted to be positioned extending transversely over the top of the head from one side of the head to the other. This strap 7, which may be referred to as the overhead strap of the headgear, is of such length as to be capable of extending over the head from ear to ear. It is provided with two holes 9, one at each end (see Fig. 7). Each end of the back strap 3 is secured to the respective end of the overhead strap 7 by a fastener 11 extending through the respective holes 5 and 9 in the straps.

A third strap 13 connects the center of the back strap 3 and the center of the overhead strap 7. The upper end of this connecting strap 13 is permanently connected to the overhead strap 7 as indicated at 15. At its lower and rearward end, the connecting strap 13 has a series of holes such as indicated at 17 spaced lengthwise thereof. The back strap 3 has a hole 19 (see Fig. 6) at the center of its length. The lower rearward end of the connecting strap 13 is removably secured to the center of the back strap 3 by means of a fastener 21 extending through the hole 19 in the back strap and one of the holes 17 in the connecting strap.

Each of the straps 3, 7 and 13 may be a strap of a suitable flexible relatively nonstretchable heat-sealable plastic material, such as a suitable vinyl resin. The connection at 15 of the strap 13 to the overhead strap 7 may be made by heat sealing. Each of the fasteners 11 may consist of an internally threaded grommet 23 and a screw 25 threaded in the grommet (see Fig. 7). The shank of the grommet 23 extends through the holes in the respective straps and has a relatively tight fit therein. The fastener 21 may be a similar type of fastener except that in this instance the grommet thereof, specially designated 23a, is one with a shorter shank than grommet 23. A washer 27 may be applied to the shank of the grommet 23a of fastener 21 between the back strap 3 and the connecting strap 13 (see Fig. 6).

The headgear 1 is provided with a pair of face bow guide members, each designated 29, one at each end of the back strap 3. Each of these guide members, as shown in Figs. 7 and 8, is formed of three individual strips 31, 33 and 35 of flexible heat-sealable plastic material such as vinyl resin. These strips are heat-sealed together all around their edges, as indicated at 37 in Figs. 7 and 8. Each guide member 29 has a rounded forward end 39. Strip 35, which is the outer of the three strips, has a first hole 41 adjacent the rounded forward end 39 of the guide member and a second hole 43 spaced inward (rearward) from hole 41. Strip 35 is heat-sealed to strip 33 along relatively narrow zones as indicated at 45 and 47 intermediate the side edges of the guide member, zone 45 extending from the forward end of the guide member to the forward hole 41, and zone 47 extending from the rearward hole 43 to the rearward end of the guide member. The sealing operation is such as to provide grooves at 45 and 47 in the outer face of the guide member, groove 45 extending from the forward end of the guide member to hole 41, groove 47 extending from hole 43 to the rearward end of the guide member. Strip 35 is not sealed to strip 33 (apart from the side edges) in the region between holes 41 and 43. This provides a passage indicated at 49 in Fig. 8 for slidably receiving the shank of a face bow 51. This face bow 51 is made of stainless steel wire, for example, in the shape of a hook, the shank thereof being designated 53. The end of the hook portion of the face bow is flattened as indicated at 55 and has a hole 57 therein for receiving a prong on an arch band. The end of the shank 53 of the face bow is bent to provide an eye 59 for attachment of an elastic band 61 (which may be small rubber band) to the shank 53.

Each guide member 29 is provided with a hole 63 (see Fig. 7) at its rearward end and a hole 65 (see Fig. 5) spaced forward of hole 63. Each guide member 29 is secured at its rearward end to the respective end of the back strap 3 by means of the fastener 11 which also secures together the respective end of the back strap 3 and the respective end of the overhead strap 7. For this purpose, as appears in Fig. 7, the shank of the grommet 23 of the fastener 11 extends through the hole 63 in the guide member 29, as well as through the holes 5 and 9 in the back strap 3 and the overhead strap 7. The guide member 29 is on the outside of the back and overhead straps 3 and 7, and the shank of the grommet 23 of the fastener 11 extends outward to some extent beyond the guide member for reception thereon of a plastic washer 67 under the head of the screw 25. Washer 59 is of smaller diameter than the head of the screw and provides an annular groove 69 between the head of the screw and the outside of the hook guide member for reception of the elastic band 61 which is attached to the eye 59 on shank 53 of the face bow 51.

The headgear 1 is adapted to be worn as illustrated in Figs. 1 and 2 with the overhead strap 7 extending around over the top of the head, the back or occipital strap 3 extending around the occiput (the back of the head), and the strap 13 extending in front-to-back direction back over the top of the head from the overhead strap 7 to the back strap 3. The guide members 29 are swingable on fasteners 11 and are adapted to assume a position angled downward and forward on the cheeks toward the corners of the mouth. The face bows 51 are adapted to be attached to an arch band for the maxillary arch (the upper teeth), and traction is exerted on the arch band by the elastic bands 61 acting through the face bows. Each face bow is slidable in the passage 49 in the respective guide member, its shank being slidably guided in the grooves 47 and 45 on the outside of the guide member. Each guide member has a triple thickness of material (layers 31, 33 and 35) under most of the length of the shank 53 of the face bow for cushioning purposes for comfort and may accordingly be referred to as an elongate essentially flat cushion member formed at the outside thereof with means for guiding the shank 53 of a face bow 51 for sliding movement lengthwise thereof. The headgear is readily adjustable by inserting grommet 23a of fastener 21 in different ones of the holes 17 in the bridging strap, and by inserting grommets 23 of fasteners 11 in holes 65 in the hook guide members instead of holes 63.

Figs. 10-14 illustrate a low pull headgear 71 of this invention. This is similar to the high pull headgear 1 in comprising a first strap 73 (the back strap), a second strap 75 (the overhead strap) and a third strap 77 (the connecting strap). The overhead strap 75 and the connecting strap 77 are longer than the overhead strap 7 and the connecting strap 13 of the high pull headgear 1 of Figs. 1-5, being of such length as to hold the back strap 73 in position to extend around the back of the neck so that it constitutes a cervical strap. The back strap 73 has a series of holes such as indicated at 79 spaced lengthwise thereof adjacent each end. The overhead strap 75 has a series of holes such as indicated at 81 spaced lengthwise thereof adjacent each end. Headgear 71 is provided with guide members 29 identical to those used in the high pull headgear 1 of Figs. 1-5. Each end of the back strap 73 is secured to the respective end of the overhead strap 75 by a fastener 11 the same as in the high pull headgear 1, the shank of the grommet 23 of this fastener 11 being received in two aligned holes 79 and 81. This fastener 11 also passes through the forward hole 65 in the guide member 29. The lower rearward end of the connecting strap 77 is removably secured to the center of the back strap 73 by means of a fastener 21 the same as in the high pull headgear 1 of Figs. 1-5, this fastener 21 passing through one of a series of holes 83 in the strap 77 corresponding to the holes 17 in the strap 13 of the high pull headgear 1. A fastener 85 which may be identical to fastener 21 also passes through the rearward hole 63 in each guide member 29 and one of the holes 79 in the back strap 73 to keep the guide member from swinging out of alignment with the back strap.

The low pull headgear 71 is adapted to be worn as illustrated in Figs. 10 and 11 with the overhead strap 75 extending around over the top of the head, the back strap 73 extending around the back of the neck, and the strap 77 extending in front-to-back direction back over the top of the head from the overhead strap 75 to the back strap 73. The overhead strap 75 is attached to the back strap 73 at such holes 81 in the overhead strap that the back strap is generally at the level of the mouth instead of above it as in the case of the high pull headgear 1 of Figs. 1-5. Accordingly, the guide members 29 of the low pull headgear extend generally horizontally toward the corners of the mouth as appears in Fig. 11, instead of being angled downward as in Fig. 2. The back strap 73 is attached to the overhead strap 75 at such holes 79 in the back strap as to have a tight fit around the back of the neck. The low pull headgear 71 is provided with face bows 51 and elastic bands 61, the same as in the high pull headgear 1, the elastic bands being hooked around fasteners 11 in the grooves 69. The face bows of the low pull headgear are adapted to be attached to an arch band for the maxillary or mandibular arch (the lower teeth), and traction is exerted on this arch band by the elastic bands acting through the face bows.

Figs. 15-17 illustrate a combination high pull and low pull headgear 91 of this invention. This is essentially similar to the low pull headgear 71 of Figs. 10-14 with the addition of an upper back strap 93 (constituting an occipital strap) and an upper pair of face bow guide members each specially designated 29a. The occipital strap 93 extends from one side of the overhead strap 75 around the connecting strap 77 to the other side of the overhead strap 75. Its ends are connected to the overhead strap by fasteners 11, these fasteners also securing the upper guide members 29a to the headgear 91 in the same manner as fasteners 11 secure the guide members 29 to the high pull headgear 1 of Figs. 1-5. The occipital strap 93 is connected at the center of its length to the connecting strap 77 by a fastener 21 in the same manner as the back straps are connected to the connecting straps in the high pull headgear 1 and the low pull headgear 71.

The combination headgear 91 is worn in the same manner as the low pull headgear 71 of Figs. 10-14. The cervical strap 73 of the combination headgear 91 extends around the back of the neck in the same manner as the cervical strap 73 of the low pull headgear of Figs. 10-14. The occipital strap 93 of the combination headgear 91 extends around the back of the head in the same manner as the back strap 3 of the low pull headgear 1 of Figs. 1-5. The upper guide members 29a of the combination headgear 91 are adapted to assume a position corresponding to that of guide members 29 of the high pull headgear 1 as illustrated in Figs. 1 and 2, and the lower guide members 29 of the combination headgear 91 are adapted to assume a position corresponding to that of the guide members 29 of the low pull headgear 71 of Figs. 10-14. The same adjustments may be made with the combination headgear as with the high pull and low pull headgears 1 and 71.

As to any of the three types of headgear above described, additional holes may be punched in the straps and/or the straps may be cut and overlapped if necessary for adjustment to fit the head.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An orthodontic headgear comprising first and second straps, fasteners securing said straps together at their ends, the second strap being adapted to extend over the top of the head from one side of the head to the other, the first strap being adapted to extend around in back from one end of the second strap to the other, a pair of face bow guide members, one at each end of the first strap, extending forwardly from the ends of the first strap, each guide member being secured to the headgear by the fastener at the respective end of the first strap, each of said guide members having a lengthwise passage for slidably guiding the shank of a face bow, each fastener being adapted to have secured thereto an elastic band for attachment to the face bow which is slidable in the respective guide member for exerting traction on the face bow, each of said first and second fasteners entending through holes in the first and second straps and the respective guide member, the guide member being located on the outside of said straps, and said fastener having a head on the outside spaced from the adjacent strap so as to provide an annular groove for receiving the elastic band.

2. An orthodontic headgear comprising first and second straps, fasteners securing said straps together at their ends, the second strap being adapted to extend over the top of the head from one side of the head to the other, the first strap being adapted to extend around in back from one end of the second strap to the other, a pair of face bow guide members, one at each end of the first strap, extending forwardly from the ends of the first strap, each guide member being secured to the headgear by the fastener at the respective end of the first strap, each of said guide members having a lengthwise passage for slidably guiding the shank of a face bow, each fastener being adapted to have secured thereto an elastic band for attachment to the face bow which is slidable in the respective guide member for exerting traction on the face bow, each of said first and second fasteners comprising a tubular grommet extending through holes in the first and second straps and the respective guide member, the guide member being located on the outside of the straps, a screw threaded in the outer end of the grommet, a head on the screw, and a washer of smaller diameter than the head positioned on the grommet under the head providing an annular groove for receiving the elastic band.

3. An orthodontic headgear comprising first and second straps, fasteners securing said straps together at their ends, the second strap being adapted to extend over the top of the head from one side of the head to the other, the first strap being adapted to extend around in back from one end of the second strap to the other, a pair of face bow guide members, one at each end of the first strap, extending forwardly from the ends of the first strap, each guide member being secured to the headgear by the fastener at the respective end of the first strap, each of said guide members comprising a plurality of layers of heat-sealable material, the layers being heat-sealed together, and the outer layer being formed to provide a passage extending lengthwise of the guide member for slidably guiding the shank of the face bow, each fastener being adapted to have secured thereto an elastic band for attachment to the face bow which is slidable in the respective guide member for exerting traction on the face bow.

4. An orthodontic headgear as set forth in claim 3 wherein the passage is formed by providing two holes in the outer layer spaced lengthwise of the guide member, said outer layer being heat-sealed to the adjacent layer at grooves extending on the outside of the guide member from the forward end of the guide member to the forward one of said holes and from the rearward one of said holes to the rearward end of the guide member, the shank of the face bow being adapted to extend through said holes and being slidable in said grooves.

5. An orthodontic headgear comprising first and second straps, first and second fasteners securing said straps together at their ends, the second strap being adapted to extend over the top of the head from one side of the head to the other, the first strap being adapted to extend around in back from one end of the second strap to the other, a third strap extending between the center of the first strap and the center of the second strap, said third strap being secured at its upper and forward end to the second strap and having a series of holes spaced lengthwise thereof at its lower and rearward end, a third fastener extending through one of said series of holes and a hole at the center of the first strap for fastening the first and third straps together, a pair of face bow guide members, one at each end of the first strap, extending forwardly from the ends of the first strap, said guide members being secured to the headgear by the first and second fasteners, each of said guide members having a lengthwise passage for slidably guiding the shank of a face bow, each of said first and second fasteners being adapted to have secured thereto an elastic band for attachment to the face bow which is slidable in the respective guide member for exerting traction on the face bow.

6. An orthodontic headgear as set forth in claim 5 wherein the second and third straps are of such length as to hold the first strap in position to extend around the back of the head so that the first strap constitutes an occipital strap.

7. An orthodontic headgear as set forth in claim 6 wherein each guide member has a series of holes spaced lengthwise thereof, each of said first and second fasteners extending through one of the holes in the respective guide member and through holes in the first and second straps, the guide member being located on the outside of said straps, and each of said first and second fasteners having a head on the outside spaced from the adjacent strap so as to provide an annular groove for receiving the elastic band.

8. An orthodontic headgear as set forth in claim 7 wherein each of said guide members comprises a plurality of layers of heat-sealable material, the layers being heat-sealed together, and the outer layer being formed to provide a passage extending lengthwise to the guide member for slidably guiding the shank of the face bow.

9. An orthodontic headgear as set forth in claim 5 wherein the second and third straps are of such length as to hold the first strap in position to extend around the back of the neck so that the first strap constitutes a cervical strap.

10. An orthodontic headgear as set forth in claim 9 wherein each of said first and second straps has a series of holes spaced lengthwise thereof at each end, and wherein each guide member has two holes spaced lengthwise thereof at its rearward end, each of said first and second fasteners extending through one of the holes in the first strap, one of the holes in the second strap and the forward one of the holes in the respective guide member, the guide member being located on the outside of the first and second straps, each of said first and second fasteners having a head on the outside spaced from the adjacent strap so as to provide an annular groove for receiving the elastic band and additional fasteners extending through the rearward holes in the guide members and respective ones of the holes in the first strap.

11. An orthodontic headgear as set forth in claim 10 wherein each of said guide members comprises a plurality of layers of heat-sealable material, the layers being heat-sealed together, and the outer layer being formed to provide a passage extending lengthwise of the guide member for slidably guiding the shank of the face bow.

12. An orthodontic headgear as set forth in claim 9, further comprising an occipital strap, additional fasteners securing the ends of said occipital strap to the second strap at points above the first and second fasteners, said occipital strap being adapted to extend around the back of the head above the cervical strap, said occipital strap being fastened at its center to said third strap, and an upper pair of face bow guide members, one at each end of said occipital strap, extending forwardly from the ends of said occipital strap, said upper guide members being secured to the headgear by said additional fasteners, and each of said additional fasteners being adapted to have secured thereto an elastic band for attachment to the face bow which is slidable in the respective upper guide member.

13. An orthodontic headgear as set forth in claim 12 wherein each of said first and second straps has a series of holes spaced lengthwise thereof at each end, and wherein each guide member has two holes spaced lengthwise thereof at its rearward end, each of said first and second fasteners extending through one of the holes in the first strap, one of the holes in the second strap and the forward one of the holes in the respective lower guide member, the guide members being located on the outside of the straps, each of said fasteners having a head on the outside spaced from the adjacent strap so as to provide an annular groove for receiving the elastic band, and additional fasteners extending through the rearward holes in the lower guide members and respective ones of the holes in the first strap.

14. An orthodontic headgear as set forth in claim 13 wherein each of said guide members comprises a plurality of layers of heat-sealable material, the layers being heat-sealed together, and the outer layer being formed to provide a passage extending lengthwise of the guide member for slidably guiding the shank of the face bow.

15. An orthodontic headgear comprising first and second straps, fasteners securing said straps together at their ends, the second strap being adapted to extend over the top of the head from one side of the head to the other, the first strap being adapted to extend around in back from one end of the second strap to the other, a pair of face bow guide members, one at each end of the first strap, extending forwardly from the ends of the first strap, each guide member being secured to the headgear by the fastener at the respective end of the first strap, each of said guide members having a lengthwise passage for slidably guiding the shank of a face bow, each fastener being adapted to have secured thereto an elastic band for attachment to the face bow which is slidable in the respective guide member for exerting traction on the face bow, the second strap being of such length as to hold the first strap in position to extend around the back of the neck so that the first strap constitutes a cervical strap, said headgear further comprising an occipital strap, additional fasteners securing the ends of said occipital strap to the second strap at points above the first and second fasteners, said occipital strap being adapted to extend around the back of the head above the cervical strap, and an upper pair of face bow guide members, one at each end of said occipital strap, extending forwardly from the ends of said occipital strap, said upper guide members being secured to the headgear by said additional fasteners, and each of said additional fasteners being adapted to have secured thereto an elastic band for attachment to the face bow which is slidable in the respective upper guide member.

16. An orthodontic headgear comprising first and second straps and a pair of face bow guide members, the second strap being adapted to extend over the top of the head from one side of the head to the other, the first strap being adapted to extend around in back from one end of the second strap to the other, fasteners connecting together the ends of the straps and the face bow guide members with the face bow guide members at the respective ends of the first strap and extending forward therefrom, a third strap extending between the center of the first strap and the center of the second strap, said third strap being connected at its upper and forward end to the second strap and at its lower and rearward end to the first strap, each of said face bow guide members being constituted by an elongate essentially flat cushion member formed at the outside thereof with means for guiding the shank of a face bow for sliding movement lengthwise thereof, and means on the outside of each face bow guide member at the end thereof which is connected to the straps adapted for attachment of one end of an elastic band, the other end of the elastic band being adapted for attachment to the face bow which is slidable in the respective guide member for exerting traction on the face bow.

17. An orthodontic headgear comprising first and second straps and a pair of face bow guide members, the second strap being adapted to extend over the top of the head from one side of the head to the other, the first strap being adapted to extend around in back from one end of the second strap to the other, fasteners connecting together the ends of the straps and the face bow guide members with the face bow guide members at the respective ends of the first strap and extending forward therefrom, a third strap extending between the center of the first strap and the center of the second strap, said third strap being secured at its upper and forward end to the second strap and having a series of holes spaced lengthwise thereof at its lower and rearward end, a fastener extending through one of said series of holes and a hole at the center of the first strap for fastening the first and third straps together, each of said face bow guide members being constituted by an elongate essentially flat cushion member formed at the outside thereof with means for guiding the shank of a face bow for sliding movement lengthwise thereof, and means on the outside of each face bow guide member at the end thereof which is connected to the straps adapted for attachment of one end of an elastic band, the other end of said elastic band being adapted for attachment to the face bow which is slidable in the respective guide member for exerting traction on the face bow.

18. An orthodontic headgear comprising a cervical strap adapted to extend around in back of the neck, lower face bow guide members extending forward from the ends of the cervical strap, a strap adapted to extend transversely over the top of the head from one side of the head to the other, fasteners securing together the cervical strap, the lower face bow guide members and said transversely extending strap, a strap extending between the center of the transversely extending strap and the cervical strap and adapted to extend in front-to-back direction over the top of the head, said front-to-back strap being connected at its upper and forward end to the transversely extending strap and at its lower and rearward end to the cervical strap, an occipital strap adapted to extend around the back of the head above the cervical strap, upper face bow guide members extending forward from the ends of the occipital strap, fasteners securing together the occipital strap, the upper face bow guide members and said transversely extending strap, a fastener securing together the occipital strap and said front-toback strap at the center of the occipital strap, each of said face bow guide members being constituted by an elongate essentially flat cushion member formed at the outside thereof with means for guiding the shank of a face bow for sliding movement lengthwise thereof, and means on the outside of each face bow guide member adapted for attachment of an elastic means for exerting traction on the face bow which is slidable in the respective guide member.

References Cited in the file of this patent
UNITED STATES PATENTS
1,613,659   Hickok ---------------- Jan. 11, 1927